United States Patent
Ebbinghaus et al.

(10) Patent No.: US 6,320,091 B1
(45) Date of Patent: Nov. 20, 2001

(54) PROCESS FOR MAKING A CERAMIC COMPOSITION FOR IMMOBILIZATION OF ACTINIDES

(75) Inventors: Bartley B. Ebbinghaus; Richard A. Van Konynenburg, both of Livermore, CA (US); Eric R. Vance, Kirrawee (AU); Martin W. Stewart, Barden Ridge (AU); Philip A. Walls, Cronulla (AU); William Allen Brummond; Guy A. Armantrout, both of Livermore, CA (US); Connie Cicero Herman, Pleasanton, CA (US); Beverly F. Hobson, Livermore, CA (US); David Thomas Herman, Pleasanton, CA (US); Paul G. Curtis; Joseph Farmer, both of Tracy, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/337,509

(22) Filed: Jun. 22, 1999

Related U.S. Application Data (60) Provisional application No. 60/090,312, filed on Jun. 23, 1998.

(51) Int. Cl.[7] .................................................. G21F 9/34

(52) U.S. Cl. ............................................................ 588/10

(58) Field of Search ................................................ 588/10

(56) References Cited

U.S. PATENT DOCUMENTS

| | | | |
|---|---|---|---|
| 4,274,976 | 6/1981 | Ringwood | 252/301.1 |
| 4,329,248 | 5/1982 | Ringwood | 252/628 |
| 4,383,855 | * 5/1983 | Aaron et al. | 419/19 |
| 4,645,624 | * 2/1987 | Ramm et al. | 252/628 |
| 4,778,626 | * 10/1988 | Ramm et al. | 252/628 |
| 5,597,516 | 1/1997 | Feng et al. | 252/625 |
| 5,613,243 | 3/1997 | Hollit et al. | 588/19 |
| 5,656,009 | 8/1997 | Feng et al. | 588/11 |

OTHER PUBLICATIONS

A.G. Solomah, T.M. Hare, and H. Palmour III, "Demonstration of the Feasibility of Subsolidus Sintering of Radwaste–Containing SYNROC–B Composition," Nucl. Technol. 49, 183–185 (1980).

F.W. Clinard, Jr., D.L. Rohr, and R.B. Roof, "Structural Damage in a Self–Irradiated Zirconolite–Based Ceramic," Nucl. Inst. And Meth. in Phys. Res. B1, 581–586 (1984).

A.G. Solomah, P.G. Richardson, and A.K. McIllwain, "Phase Identification, Microstructural Characterization, Phase Microanalyses and Leaching Performance Evaluation of SYNROC–FA Crystalline Ceramic Waste Form," J. Nucl. Mater. 148, 157–165 (1987).

V.M. Oversby, R.A. Van Konynenburg, W.E. Glassley, and P.G. Curtis, "Immobilization in Ceramic Waste Forms of the Residues from Treatment of Mixed Wastes," Materials Research Society Symposium Proceedings, vol. 333, Scientific Basis for Nuclear Waste Management XVII, A. Barkatt and R.A. Van Konynenburg, eds., Materials Research Society, Pittsburgh, PA (1994), pp. 285–292.

(List continued on next page.)

Primary Examiner—Daniel J. Jenkins
(74) Attorney, Agent, or Firm—Randall W. Chang; William C. Daubenspeck; Virginia B. Caress (57) ABSTRACT

Disclosed is a process for making a ceramic composition for the immobilization of actinides, particularly uranium and plutonium. The ceramic is a titanate material comprising pyrochlore, brannerite and rutile. The process comprises oxidizing the actinides, milling the oxides to a powder, blending them with ceramic precursors, cold pressing the blend and sintering the pressed material.

46 Claims, 5 Drawing Sheets

Flow Diagram of Immobilization Process
(Actinide Oxides)

OTHER PUBLICATIONS

R. Van Konynenburg, memorandum to Bill Halsey, "A Titanate Mineral Waste Form for Dismantled Weapons Plutonium," Lawrence Livermore National Laboratory, Livermore, CA (Feb. 10, 1994).

B. Ebbinghaus, R. Van Konynenburg, E. Vance, A. Jostsons, R. Anthony, C. Philip, and D. Wronkiewicz, "Status of Plutonium Ceramic Immobilization Processes and Immobilization Forms," pp. 253–261 in Final Proceedings, Plutonium Stabilization & Immobilization Workshop, CONF–951259, U.S. Department of Energy, Washington, D.C. (May 30, 1996).

B.B. Ebbinghaus, R.A. Van Konynenburg, J. M. Lawson, W. L. Close, P.G. Curtis, M.W.A. Stewart, E.R. Vance and M.L. Carter, "Progress on Ceramic Immobilized Forms for Pu Disposition", Presented at 20th Actinide Separations Conference, Ithaca, IL, USA, Jun. 13, 1996, (copy not provided).

B.B. Ebbinghaus, R.A. Van Konynenburg, H. Shaw, R. Ryerson, P.G. Curtis, W.L. Close, R. Burns, J.M. Lawson, E.R. Vance, M.W.A. Stewart, R.A. Day, M.J. Hambley, A. Brownscombe, J. Allender, T. Rankin, J. Congdon, E. Buck, A. Bakel, R. Putnam and A. Navrotsky, "Ceramic Formulation for the Immobilization of Plutonium", Presented at 21st Actinide Separations Conference, Charleston, SC, USA, Jun. 23–26, 1997.

Farmer, J.C., "U.S. Fissile Materials Disposition Program Form & Process Development Activities," UCR-L–MI–127979, Lawrence Livermore National Laboratory, Livermore, CA (Jul. 1997), presentation: "Plutonium Immobilization Ceramic Process Development and Demonstration" by W. Brummond.

L.J. Jardine, G.A. Armantrout, W.L. Bourcier, W.A. Brummond, B. B. Ebbinghaus, H.F. Shaw, R.A. Van Konynenburg, and P. Zhao, "U.S.—Russian Experts NATO Collaborative Research Grant Exchange Visit Meetings on Excess Weapons Pu Ceramics Formulations and Characterizations," UCRL–ID–129328, Lawrence Livermore National Laboratory, Livermore, CA (1997), (relevant page attached).

R.A. Van Konynenburg, B.B. Ebbinghaus, and H.F. Shaw, "Formulation of Ceramic for Plutonium Immobilization," UCRL–JC–128979–ABS (abstract for a talk at the American Chemical Society Spring Meeting), Lawrence Livermore National Laboratory, Livermore, CA (1997).

B. Ebbinghaus, R. Van Konynenburg, H. Shaw, P. Curtis, W. Close, R. Burns, E. Vance, M. Stewart, J. Allender, T. Rankin, and J. Congdon, "Ceramic Formulation for the Immobilization of Plutonium," UCRL–JC–127614–ABS (abstract for the 21st Annual Actinide Separations Conference, Charleston SC, Jun. 23–26, 1997) Lawrence Livermore National Laboratory, Livermore, CA (1997).

B.B. Ebbinghaus, R.A. Van Konynenburg, F. J. Ryerson, E.R. Vance, M.W.A. Stewart, A Jostsons, J.S. Allender, T. Rankin and J. Congdon, "Ceramic Formulation for the Immobilization of Plutonium", Waste Management 98, Tuscon Arizona, USA, Mar. 5, 1998.

R.A. Van Konynenburg and B.B. Ebbinghaus, "Ceramic Formulation for Plutonium Immobilization," UCRL–JC–130111–ABS (abstract for the 22nd Annual Actinide Separations Conference), Lawrence Livermore National Laboratory, Livermore, CA (1998).

B.B. Ebbinghaus et al., "Plutonium Immobilization Project Baseline Formulation," UCRL–ID–133089, PIP–99–012, pp. 31–40, Lawrence Livermore National Laboratory, Livermore, CA (Feb. 1999).

A.Jostons, L. Vance and B. Ebbinghaus, Immobilization of Surplus Plutonium in Titanate Ceramics, Proceedings of the International Conference on Future Nuclear Systems, Aug. 29–Sep. 3, 1999; Jackson Hole, Wyoming, USA, CD–ROM.

S. Cochran et al, "Fissle Material Disposition Program Final Immobilization Form Assessment and Recommendation", UCRL–ID–128705, pp. 24–29, Oct. 3, 1997.

W. Brummond et al, "Fissile Materials Disposition Program Tech Eval Panel Summary Report: Ceramic and Glass Immobilization Options", UCRL–ID–129315, pp. 5–10 to 5–12, Dec. 23, 1997.

T. Gould et al, "Evaluation of Candidate Glass and Ceramic Forms for Immobilization of Surplus Plutonium", UCR-L–JC–130952, Jun. 12, 1998.

C.C. Herman, et. al. "Immobilization of Surplus US Plutonium for Eventual Geologic Disposal", Presented at Waste Management 99, Tucson, AZ; Feb. 28 to Mar. 4, 1999.

C.C. Herman, et. al., Process and Equipment Development for the Immobilization of Surplus Plutonium in a Ceramic Form, Presented at the American Institute of Chemical Engineers 1999 Spring National Meeting, Houston, TX; Mar. 14–18, 1999.

William Brummond and Guy Armantrout, "Ceramic Process Development and Demonstration".Presented at the AIChE Spring Meeting in New Orleans, LA, Mar. 10, 1998.

William Brummond et al, "Ceramic Process Equipment Development for the Disposition of Surplus Plutonium", Presented at the American Nuclear Society, Charleston, SC. Sep. 8–11, 1998.

William Brummond et al, "EIS Data Call Input Report: Plutonium Immobilization Plant Using Ceramic in New Facilities at the Savannah River Site", UCRL–ID–128273, Jun. 1998, pp. 4–12 to 4–18.

William Brummond et al, "EIS Data Call Input Report: Plutonium Immobilization Plant Using Ceramic in Existing Facilities at the Savannah River Site", UCRL–ID–128273, Jun. 1998, pp. 4–12 to 4–18.

William Brummond et al, "EIS Data Call Input Report: Plutonium Immobilization Plant Using Ceramic in Existing Facilities at the Savannah River Site", UCRL–ID–128274, Jun. 1998, pp. 4–12 to 4–18 (copy not provided).

William Brummond et al, "EIS Data Call Input Report: Plutonium Immobilization Plant Using Ceramic in Existing Facilities at Hanford", UCRL–ID–128275, Jun. 1998, pp. 4–12 to 4–18 (copy not provided).

William Brummond et al, "Plutonium Immobilization: Ceramic Process Development and Demonstration", UCRL–JC–126889–ABS (abstract). This is the abstract and viewgraphs for an oral presentation made at the 21st Annual Actinide Separations Conference in Charleston, SC, Jun. 23–27, 1997.

W. Brummond and G. Armantrout, "Ceramic Process Equipment for the Immobilization of Plutonium", Waste Management 98, Tucson Arizona, USA, Mar. 1998.

* cited by examiner

FIG. 1
Depiction of the processing regime.

FIG. 2
Phase boundaries in the system Ca(Hf,Zr)Ti$_2$O$_7$-Ca(Pu,Ce)Ti$_2$O$_7$-CaUTi$_2$O$_7$.

FIG. 3
Flow Diagram of Actinide Oxidation Process

FIG. 4
Flow Diagram of Immobilization Process
(Actinide Oxides)

FIG. 5
Flow Diagram of Ceramic Precursor Fabrication

PROCESS FOR MAKING A CERAMIC COMPOSITION FOR IMMOBILIZATION OF ACTINIDES

CROSS-REFERENCE TO RELATED APPLICATIONS

This application claims the benefit of U.S. Provisional Application No. 60/090,312, filed Jun. 23, 1998, entitled "Ceramic Composition and Process for Immobilization of Actinides", which is incorporated herein by this reference.

This application is related to U.S. Pat. No. 6,137,025, issued Oct. 24, 2000, Ceramic Composition for Immobilization of Actinides.

STATEMENT OF GOVERNMENT INTEREST

The United States Government has rights in this invention pursuant to Contract No. W-7405-ENG-48 between the U.S. Department of Energy and the University of California.

BACKGROUND OF THE INVENTION

1. Field of the Invention

The present invention relates generally to a process for making a ceramic composition suitable for immobilizing actinides, in particular plutonium, thorium and uranium. The ceramic composition comprises pyrochlore, brannerite and rutile. The ceramic composition is attractive for immobilization of excess plutonium because of its extremely low leachability, the existence of natural mineral analogues that have demonstrated actinide immobilization over hundreds of millions of years in wet geological environments, and the high solid solubility of actinides in the ceramic thus providing a relatively low overall waste volume. Incorporation of plutonium into ceramic provides a form that is relatively easy to store but renders retrieval of the plutonium to be more difficult than other immobilized forms. The process relates particularly to a cold pressing and sintering process for making said ceramic composition, which allows for impurities in the actinides feedstock.

2. Description of Related Art

Because of their extreme durability, ceramic forms have been studied extensively since the late 1970s for the immobilization of high level waste (HLW). The material called Synthetic Rock (SYNROC) is a titanate-based ceramic composed approximately of 30% zirconolite, 30% hollandite, 30% perovskite and 10% rutile. In the HLW application, actinides partition into the zirconolite and perovskite phases. U.S. Pat. Nos. 4,274,976 (Ringwood), 4,329,248 (Ringwood), 4,645,624 (Ramm, Ringwood) and 4,808,337 (Ramm et al) disclose the immobilization of HLW in synthetic rock.

A form of synthetic rock to immobilize spent fuel (SYNROC-F) was reported by S. E. Kesson and A. E. Ringwood, "Safe Disposal of Spent Nuclear Fuel", Radioactive Waste Management and the Nuclear Fuel Cycle, Vol. 4(2), pp. 159–174, October 1983. This form of SYNROC consisted of 90 wt % uranium pyrochlore, 5 wt % hollandite and 5 wt % rutile.

A variant of SYNROC-F, namely SYNROC-FA was reported by A. G. Solomah, P. G. Richardson and A. K. Mcllwain, "Phase Identification, Microstructural Characterization, Phase Microanalyses and Leaching Performance Evaluation of SYNROC-FA Crystalline Ceramic Waste Form", Journal of Nuclear Materials 148, pp. 157–165, 1987. This form of SYNROC consisted of uranium pyrochlore, perovskite, uraninite and hollandite.

A cold press and sinter process is used in the production of mixed oxide (MOX) fuel from uranium and plutonium. The MOX process uses pressing pressures in excess of 20,000 psi and sintering temperatures of 1,700 deg C. in a 4% $H_2$ atmosphere on a 24 hour cycle. Because the final product is to be used as fuel, impurities in the feedstock cannot be tolerated.

SUMMARY OF THE INVENTION

An object of this invention is to provide a process for making a ceramic material for immobilization of actinides, including plutonium, uranium, thorium, americium and neptunium, said immobilized actinides then being suitable for storage in an underground repository.

The desired characteristics of such a ceramic material include: a) low leachability, b) high solid solubility of actinides in the ceramic, c) ability to incorporate "high-fired" $PuO_2$ of nominal particle size of 20 microns and less than 50 microns, d) sufficient compositional flexibility to incorporate significant concentrations of Pu and neutron absorbers (such as gadolinium and hafnium) as well as varying impurities in the feed streams, e) thermal stability during high level waste glass pouring in can-in-canister configurations, f) high chemical durability in the geologic repository environments both before and after undergoing radiation damage from alpha decay, g) difficult recoverability of plutonium from the ceramic to impede proliferation.

The ceramic composition comprises pyrochlore, brannerite and rutile. A pyrochlore matrix provides the means to incorporate a higher concentration of plutonium than a zirconolite matrix. SYNROC compositions have contained hollandite, which the present composition does not. Other compositions have utilized reactive plutonium (such as dissolved plutonium) whereas the present composition starts with unreactive ("high fired") plutonium. The present composition also tolerates greater than 50 wt % impurities in the actinide feedstocks. The present composition has been found to be stable when subjected to high level waste glass pouring in a storage canister. More specifically the mineralogical composition remains unchanged and the pellets retain their physical integrity.

The present invention also relates to a process for making said ceramic composition which involves milling the actinides to a fine powder, blending the actinide powder with ceramic precursors, granulating the blend to facilitate flow into the press and die set, cold pressing the blend, followed by sintering. This is in contrast to the SYNROC process, which involves hot uniaxial or isostatic pressing. In addition, processes producing SYNROC have formed hollandite, which the present process does not. The production of mixed oxide (MOX) fuel also uses a cold press and sinter process, however there are critical differences in process parameters, which lead to differences in the end products. In addition, the MOX process cannot tolerate impurities in the uranium and plutonium feedstocks, whereas the present process does (up to 55.7 wt % in the actinide feedstock).

DETAILED DESCRIPTION OF THE INVENTION

Abbreviations
Al—aluminum
Am—americium
ANSTO—Australian Nuclear Science and Technology Organization
Ba-barium
Ca—calcium
Ce—cerium
cm—centimeter
Cr—chromium
deg C.—temperature measured in degrees Celsius
DWPF—Defense Waste Processing Facility
EDS—energy dispersive spectrometry
Ga—gallium
Gd—gadolinium
H—hydrogen
Hf—hafnium
HLW—High Level Waste
LLNL—Lawrence Livermore National Laboratory
Mo—molybdenum
MOX—mixed oxides
MPa—megaPascals
MT—metric ton
Na—sodium
Ni—nickel
Np—neptunium
O—oxygen
P—phosphorus
ppm—parts per million
psi—pounds per square inch
Pu—plutonium
PUREX—plutonium-uranium extraction
SEM—scanning electron microscopy
Si—silicon
Sm—samarium
SRS—Savannah River Site
SYNROC—synthetic rock
Ta—tantalum
Th—thorium
Ti—titanium
U—uranium
vol %—volume percent
W—tungsten
wt %—weight percent
ZPPR—Zero Power Physics Reactor
Zn—zinc
Zr—zirconium
Definitions
actinide oxide—a mineral phase of the form $AnO_2$, where An is generally U, but can include Th, Np, Pu and Am
alkalis—lithium, sodium, potassium, rubidium, cesium
alkaline earths—magnesium, calcium, strontium, barium
brannerite—a mineral phase of the form $CTi_2O_6$ where C is an actinide selected from the group consisting of U, Pu, Th, Np, and Am.
calcining—heating materials to high temperatures to drive off water and other volatile substances
hafnia—$HfO_2$
halides—fluorides, chlorides, bromides, iodides
high fired—heated or fired at temperatures greater than 650 deg C.
hollandite—a mineral phase having the approximate composition $BaAl_2Ti_6O_{16}$
monazite—a mineral phase having the approximate composition $CePO_4$
perovskite—a mineral phase having the approximate composition $CaTiO_3$
pyrochlore—a cubic mineral phase of the form: $A_2Ti_2O_7$, where A can be a range of ions, including Ca, Gd, Hf, Sm, U, Pu, Th, Np and Am.
reactive sintering—reacting a particulate material, agglomerate, or product by heating or firing close to but below the melting point, resulting in a densified, crystallized, bonded and/or stabilized final product.
rutile—$TiO_2$
simulated DWPF thermal cycle—a thermal cycle that simulates the pouring and cooling of high level waste glass around cans containing the ceramic, in the DWPF as part of the DOE disposition process
whitlockite—a mineral phase having the approximate composition $Ca_3(PO_4)_2$
zirconolite—$CaATi_2O_7$ where A is selected from the group consisting of Zr, Hf, Gd and Sm
Ceramic Formulation A novel formulation of titanate-based minerals has been discovered to be capable of effectively immobilizing actinides. Said actinides include plutonium, uranium, thorium, americium and neptunium, preferably uranium and plutonium. Other radioactive materials such as transuranic and high-level wastes that contain significant amounts of actinides may be immobilized in this ceramic composition where said actinides in the waste have been concentrated prior to immobilization in the ceramic form.

This formulation consists primarily of pyrochlore, brannerite and rutile. Immobilization in the baseline formulation is accomplished by elemental substitution of the plutonium into lattice sites of pyrochlore. Pyrochlore provides the means to incorporate higher quantities of actinides than with zirconolite. This formulation demonstrates the ability to incorporate a high uranium and plutonium concentration (elemental up to 32 wt %, in oxides form up to 36 wt %) without significant changes in properties or mineralogy. Neutron absorber loadings (gadolinium, hafnium, samarium) are not affected by interchanging uranium for plutonium. Pyrochlore is less susceptible than zirconolite to long term, radiation induced damage effects from alpha decay of the plutonium that would lead to enhanced dissolution of the waste form during exposure to groundwater. Naturally occurring pyrochlores can retain actinides for billions of years even when extensive secondary alteration due to contact with fluids at temperatures less than 100 deg C. has occurred. The composition is further described in patent application entitled "Ceramic Composition for Immobilization of Actinides", by inventors: Bartley B. Ebbinghaus, Richard A. Van Konynenburg, Eric R. Vance, Martin W. Stewart, Adam Jostsons, Jeffrey S. Allender, and D. Thomas Rankin, which is incorporated herein by reference.

The ceramic form has been found to be two to four orders of magnitude more durable than alternate glass forms as measured by dissolution rates in aqueous solution. Plutonium in the immobilized form cannot be extracted and purified by currently existing standard processes, such as the PUREX process. Significant changes in the head end processing would be required.

The immobilization form is capable of incorporating "high-fired" plutonium oxide with nominal particle sizes less than 2 millimeters, preferably less than 150 microns, in diameter, directly into the form. The immobilization form is capable of incorporating a wide variety of impurities relevant to the plutonium disposition mission, up to 55.7 wt %. Compositions with impurities up to 13 wt % in the product form were tested with no apparent detriment to the form.

Figure 1:
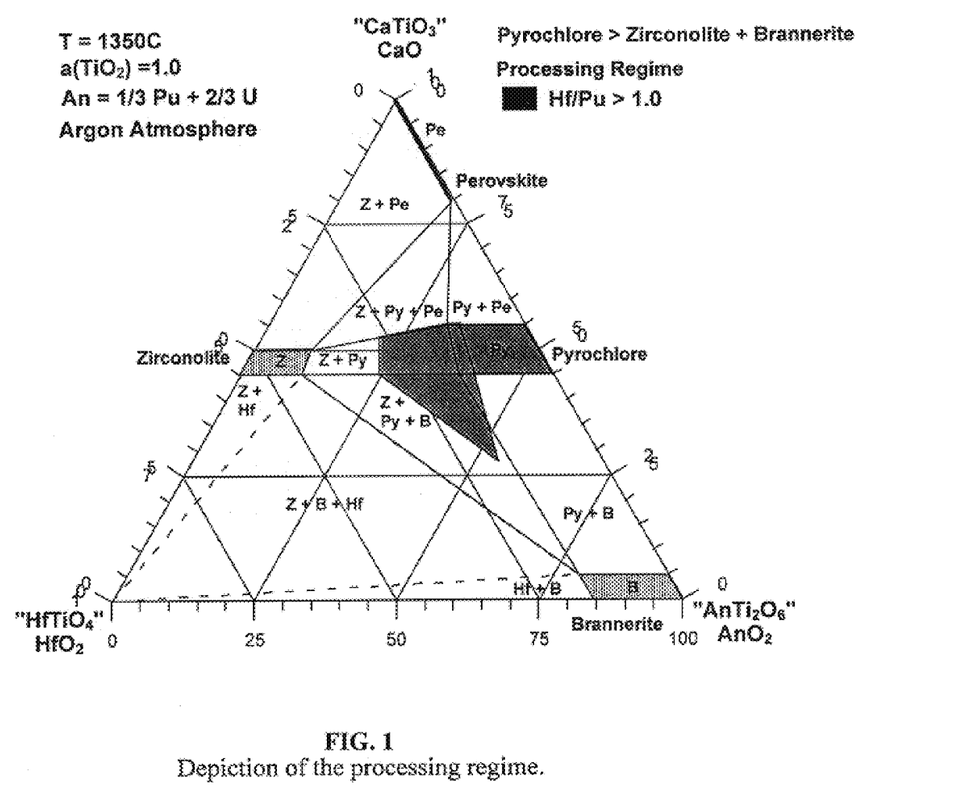
FIG. 1 illustrates the processing regime for the inventive ceramic.

FIG. 1 shows a preliminary processing regime that defines the compositional space in which the ceramic is generated. The amount of pyrochlore is greater than 50% volumetric fraction, preferably 80% volumetric fraction. The amount of brannerite is up to 50% volumetric fraction, preferably 12%. The amount of zirconolite is up to 50% volumetric fraction, preferably 0%. The amount of rutile is up to 20% volumetric fraction, preferably 8%. The amount of actinide oxide is up to 1% volumetric fraction, preferably less than 0.5%. Other phases may also be present, up to 10% volumetric fraction, preferably 0%. Said other phases can be silicate, whitlockite, monazite, perovskite, magnesium titanate, ilmenite, pseudobrookite, corundum, calcium uranium vanadate, hafnium titanate, magnesium aluminum titanate, magnetoplumbite, or calcium aluminum titanate.

To maintain criticality control, especially where the actinide is plutonium, the ceramic should contain an adequate amount of neutron absorbers (such as hafnium, gadolinium and samarium). The preferred amounts are defined as overall molar ratios of Hf-to-Pu and Gd-to-Pu such that both are equal to or greater than unity.

To depict on a ternary phase diagram the processing regime in which the ceramic is formed (See FIG. 1), the number of variables had to be reduced from 6 (the number of oxide components) to 3. Since $UO_2$ and $PuO_2$ are known to be interchangeable in the formulation without changing the compositional phase boundaries, they can be considered as one oxide ($AnO_2$), thus reducing the number of variables to 5. The form is designed to contain excess rutile, which is essentially pure $TiO_2$, so its activity is fixed at unity, thus reducing the number of variables to 4. Gd is known to partition relatively evenly between the three primary actinide-bearing phases, pyrochlore, zirconolite, and brannerite. Consequently, the Gd can be factored out without inducing too much error, thus reducing the number of variables to the desired value of 3. The resulting ternary phase diagram is depicted in FIG. 1. Perovskite is abbreviated as "Pe." Pyrochlore is abbreviated as "Py." Zirconolite is abbreviated as "Z." Brannerite is abbreviated as "B," and $HfTiO_4$ is abbreviated as "Hf." The "acceptable" processing regime is identified by the diagonal lined region in FIG. 1. In the process planned for actual disposition, $UO_2$ and $PuO_2$ will be added to a preblended mixture of the other components. The composition of the preblended mixture would fall at approximately 0.25 units of $HfO_2$ and 0.75 units of CaO. Addition of $UO_2$ and/or $PuO_2$ would cause the resulting mixture to fall on a straight line between this point and the $AnO_2$ point. The intersection of this imaginary line with the identified "acceptable" processing range indicates that there is a fairly wide range of $UO_2$ and/or $PuO_2$ compositions that lie within the "acceptable" range.

Process for Forming Ceramic

Figure 3:
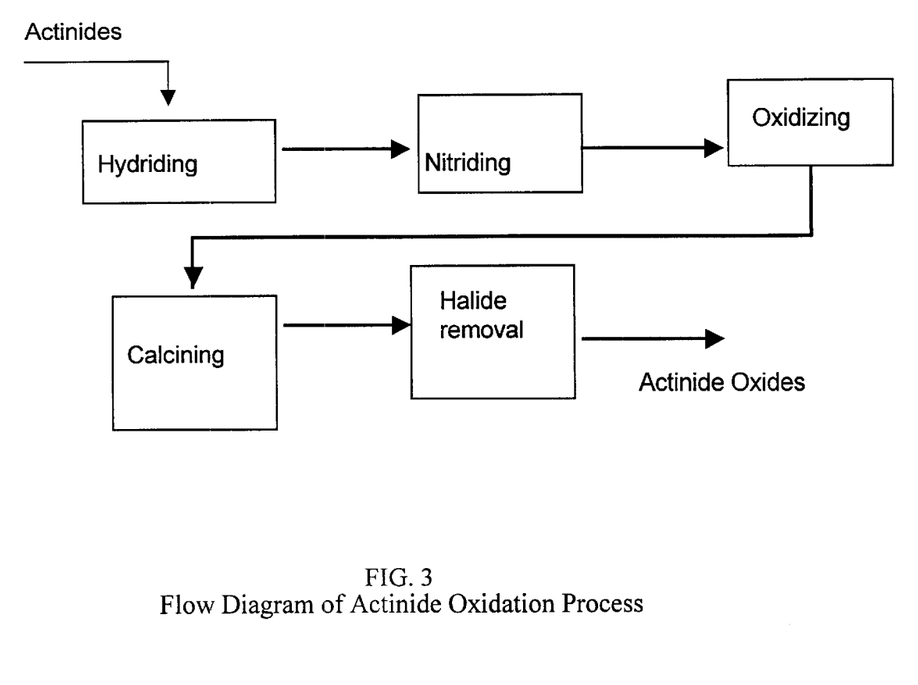
FIG. 3 illustrates the actinide oxidation process.

Actinides, preferably uranium and plutonium, are first oxidized. The actinides may be oxidized via a process which involves hydriding the actinides to a fine powder, nitriding the hydride powder, and then oxidizing the powder. Those actinide oxides that have not been previously calcined are preferably calcined to remove moisture and other volatile substances. Calcination temperature is greater than 750 deg C., preferably 950 deg C., in an air or inert atmosphere. The actinides are preferably calcined for about one hour. Preferably a halide removal step to remove halide impurities follows the calcination step. The oxidation process is shown in FIG. 3.

Figure 4:
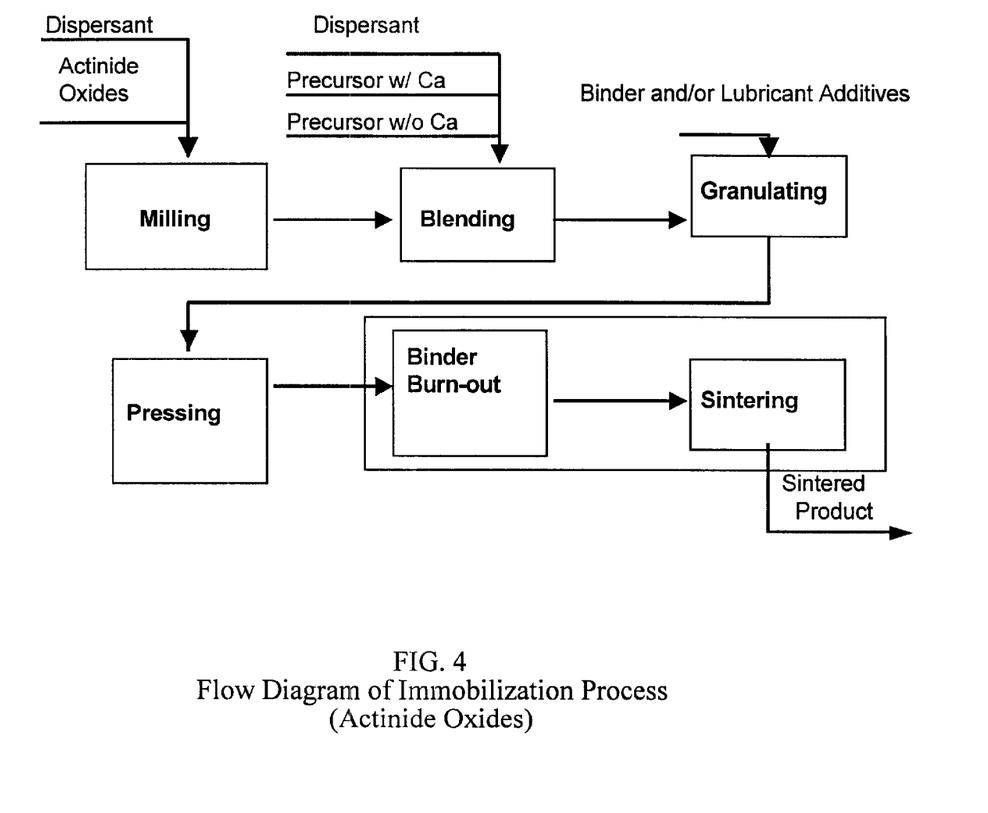
FIG. 4 illustrates the immobilization process utilizing actinide already in oxidized form.

The overall immobilization process for actinide oxides is shown in FIG. 4. The actinide oxides, preferably oxides of uranium ($UO_2$, $U_3O_8$, $UO_3$) and plutonium ($PuO_2$), are milled to a fine powder of particle sizes less than 50 microns, preferably nominally 20 microns in diameter. Reduction to this particle size is necessary to ensure essentially complete reaction of the actinide oxides with the ceramic precursors in subsequent sintering operations. Larger particles will only partially react, leaving islands of actinide-rich minerals or unreacted actinide oxide encased in the mineral structure. While this may be acceptable for the desired repository performance, it complicates the form characterization and acceptance for the repository if present in significant quantities. Various means may be used to mill the actinide oxides, ball mills, jet mills and attritor mills being preferred, with attritor mills being the most preferred. The ratio of uranium oxide to plutonium oxide is preferably about 2:1 to ensure the dominant formation of the desired pyrochlore mineral phase.

The actinide oxide powder then undergoes a mixing-blending step. During this mixing-blending step, ceramic precursors are blended in. Blending should be on the microscale to ensure uniform reaction of the actinides and precursors. If this blending is not adequately performed on the micro-scale, then islands of actinide-rich and actinide-lean mineral forms can result. While these non-uniform products may well be acceptable with regard to repository performance, they will complicate the licensing and repository acceptance process.

The above mentioned ceramic precursors comprise neutron absorbers, oxides of titanium, and hydroxides of calcium, preferably $TiO_2$ and $Ca(OH)_2$, respectively. The anatase form of $TiO_2$ is preferred. Said neutron absorbers comprise hafnium, gadolinium and samarium, preferably hafnium ($HfO_2$) and gadolinium ($Gd_2O_3$) in combination. Amounts of $Gd_2O_3$ and $HfO_2$ are preferably 8.0 wt % and 10.6 wt %. It is also preferred that the ratio of $Gd_2O_3$ to $PuO_2$ and the ratio of $HfO_2$ to $PuO_2$ each be greater than or equal to unity. The neutron absorbers are present to ensure criticality control in the final material. More reactive forms of the actinides and ceramic precursors may be used as starting materials, including nitrates, alkoxides and carbonates. However, when these materials are used, they should be converted to oxides in a calcination step before sintering in the final form.

Figure 5:
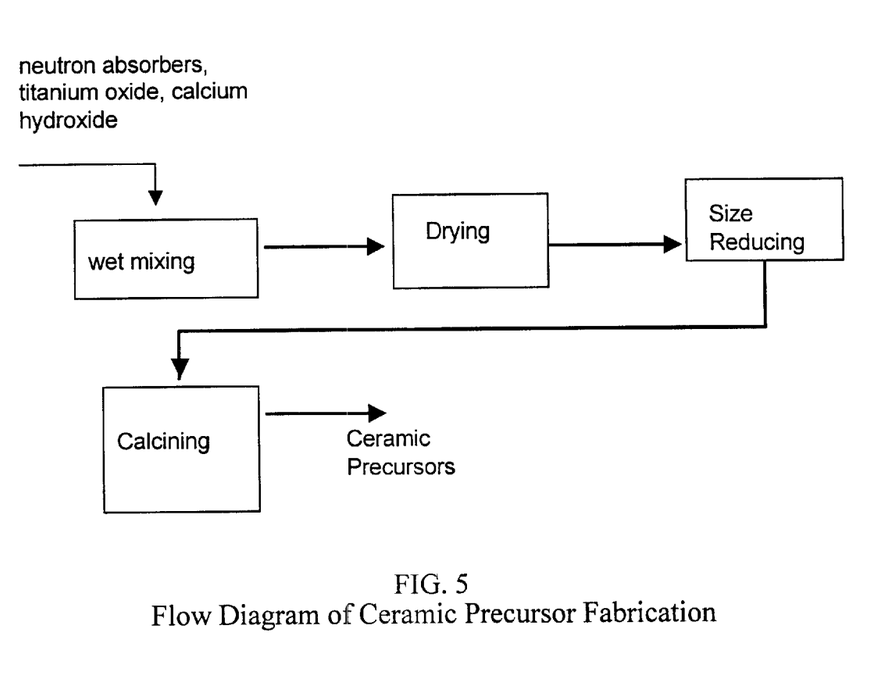
FIG. 5 illustrates the ceramic precursor fabrication process.

Two different methods of precursor fabrication can be performed depending on the desired final form. For large-scale, production-sized forms, the precursor materials, nominally consisting of $TiO_2$, $Ca(OH)_2$, $Gd_2O_3$, and $HfO_2$, are wet mixed, dried, size reduced, and then calcined. For small-scale, development testing forms, the precursor materials may be added to the pre-sized actinide feed and then wet mixed, dried, size reduced, and then calcined. In both cases, the following specifications are applied. The preferred method for wet mixing the precursor materials involves wet ball milling in a high-alumina milling jar with stabilized zirconia grinding media for a minimum of 2 hours. Dry mixing and other methods of wet mixing have been demonstrated, but the process stated above is preferred. After wet mixing, the wet slurry is separated from the grinding media and dried in a oven set at 105° C. for approximately 16 hours. Other methods of drying have been demonstrated, but convection drying is preferred. After drying, the material is size reduced to a nominal size less than 1 mm and to ensure reactivity during calcining. The material is then calcined in air between 700 and 800° C.,preferably 750° C.,for 1 hour for large-scale forms. The overall process is shown in FIG. 5. When small-scale forms are desired and the actinides have already been blended with the precursor materials, the materials are calcined between 600 and 750° C. for 1 hour in air. Some classification of the material is required to obtain a flowable powder, the preferred size range is less than 1 mm but greater than 150 μm. In some applications, it is desirable to add the preferred binder to the precursors before they are mixed with the actinides.

Sintering aids in amounts ranging from 0.1 to 5 wt % may be blended with the precursors and actinides to facilitate the sintering process. Preferred sintering aids include $B_2O_3$, $Al_2O_3$, $SiO_2$, and Alkali and Alkaline earth oxides, halides, sulfates, and hydroxides. Halides include fluorides, chlorides, bromides and iodides. Alkalis include lithium, sodium, potassium, rubidium and cesium. Alkaline earths include magnesium, calcium, strontium and barium. High loadings of $^{238}U$ are intended to ensure additional criticality control in the ceramic form through limitation of $^{235}U/^{238}U$ ratio as $^{239}Pu$ decays to $^{235}U$ in the long term.

Blending of the ceramic precursors with the actinide oxides can be accomplished in several ways. One way is to use ball-milling with an aqueous vehicle. Good blend has been achieved on the scale necessary to ensure uniform mineral products. However, the addition of water to the process complicates criticality control and necessitates additional processing steps. An alternate technique, which is being developed for plant use for ceramic formation, is the use of a high-energy device such as an attritor mill. The mill provides the additional energy necessary to break up the agglomerated particles of the plutonium and uranium oxide for blending on a micro-scale. Additives (dispersants) are preferably added to enhance flowability and reduce holdup of the mill. Examples of these additives include ethylene bis-stearamide, polyolefin, stearic acid, citric acid and monoisopropanol-amine.

Two methods of mixing the precursors with the actinides have been tested. The first method involves first grinding the actinides and then mixing in the precursors in a separate attritor mill. The second method utilizes one large mill to grind the actinides and mix them with precursor material at the same time. In a one-gallon high-speed attritor mill, which has been used for most of the testing, agitator speeds range from 600 to 1100 rpm with a preferred running speed of approximately 950 rpm. Acceptable milling media size is two to five-millimeter spheres, preferably five-millimeter media. The milling media is zirconia, aluminum oxide, depleted uranium, stainless steel, or ceramic, preferably stabilized zirconia, most preferably zirconia stabilized with yttria. To scale up the process for use in larger attritor mills, the parameter to be held constant is the tip speed. For a given rpm, the edge of the agitator arm in the larger mill will be moving faster than in the smaller mill. This will affect how the powder is worked. Thus it is important that the tip speed of the agitator arms is matched when using larger mills. Milling and/or mixing times range from three to twelve minutes with a preferred run time of five minutes. Generally, the run time is increased by two to three minutes if the material is being milled and mixed in the same attritor. The five-minute run time has been used for batches ranging from five hundred grams to one thousand grams of material. Higher milling rpms will generally result in greater uniformity of particle size and shorter run times. Milling and mixing times need to be sufficiently long to achieve the desired particle size and for a homogenous mix. Excessively long mixing times may result in demixing, wherein the constituents begin to separate. Each time the attritor is run a small amount of dispersant is added to the powder to maintain powder flowability. The amount is dependent upon the type used, but ranges from one-tenth of a percent to five percent based on the batch weight, preferably in the range of 0.5 to 3%. Preferably, either one-half weight percent of ethylene bis-stearamide or three weight percent of polyolefin are used. The additive is used in the same amounts whether the actinides are milled independently and then mixed, or co-milled and mixed.

The mixture is then granulated to facilitate uniform flow into a press die set. During the granulation step, binder and lubricant materials are added. Acceptable granules have been formed with hydroxy-propyl methylcellulose and/or polyethylene glycol added in a water emulsion as the binder. The preferred binder will have the following proportions: 0.5 to 2 wt % hydroxy-propyl methylcellulose, 0.5 to 5 wt % polyethylene glycol, and 0.5 to 10 wt % water. The preferred lubricants include ethylene bis-stearamide and polyolefin. Granulation is preferred because of the tendency for the finely milled blend to clump, and the milled blend is difficult to meter and transfer to the press system. In addition, handling of such finely milled powder presents the possibility of excess dusting when the milled and blended powder is removed from the contained powder preparation unit. Once granulated, the blended milled product is easily transferred, metered, and stored and is relatively dust-less during handling. A "V" shell blender, a blade granulator, a fluid bed, a pin mixer, a slant double cone blender, and a roll compactor have been used for granulation and have all been shown to meet the flowability criteria. In some applications, lubricants are not added to the powders and are instead applied to the die walls. Studies have shown that ten weight percent oleic acid added to acetone is an acceptable external lubricant.

The granulated mixture is then poured into a press die set and cold pressed at a pressure range of 1,000–20,000 psi, preferably at 2,000 psi for large-scale ceramic forms. This greatly minimizes die wear and press operation difficulties. However, due to the low pressing force, the resulting green ceramic materials can be relatively fragile until they are sintered, and some care should be taken in handling. Since the sintering used for ceramic formation is reactive sintering, relatively low green densities are required for the cold pressing operation product. Theoretical maximum sintered density is about 5.91 $g/cm^3$. Actual densities obtained are usually greater than 90% of theoretical.

When binders or lubricants are used, a binder bum-out stage should be used in the sintering cycle. The preferred temperature range of this step is 100 to 300° C. and the preferred time is one-half to 3 hours. This stage is necessary to thoroughly dry the ceramic and decompose the binder and lubricants added.

The pressed mixture is reactively sintered at a temperature in the range of 1200–1500 deg C., for 1–8 hours. The sintering atmosphere should be air, or an inert atmosphere such as helium, neon, argon, krypton or xenon, or a reducing atmosphere comprising 5%CO and 95% $CO_2$. It is preferred that the sintering occur in an air atmosphere. It is preferred that the sinter temperature be 1350 deg C. and the temperature held for four hours. The sintered ceramic may then be cooled to room temperature. The sintering process results in densification of the material and formation of the desired microstructure and mineral phases.

Following immobilization of the actinides in ceramic form, the ceramic may be loaded into cans. The cans may then be loaded into canisters, with high level waste glass poured into the canisters around the cans.

Experimental Results and Discussion

The starting materials are research-grade oxide powders (hydroxide powder, in the case of calcium) in the micrometer size range. The composition of the baseline ceramic (in weight %) is as follows: CaO-10.0; $TiO_2$-35.8; $HfO_2$-10.6; $Gd_2O_3$-8.0; $UO_2$-23.7; and $PuO_2$-11.9. Note that the anatase form of $TiO_2$ is used. On a molar basis the following substitutions can be made without significantly affecting the product mineralogy or product properties:

$PuO_2$ can be replaced with $CeO_2$, $UO_2$, and/or $ThO_2$
$UO_2$ can be replaced with $PuO_2$, $CeO_2$, and/or $ThO_2$
$HfO_2$ can be replaced with $ZrO_2$
$Gd_2O_3$ can be replaced with $Sm_2O_3$.

In small-scale, form development testing, these powders are wet-mixed for one hour using a ball mill with $Al_2O_3$ or $ZrO_2$ grinding media and deionized water. They are then separated by sieving and flushing with water and are dried overnight at about 90 deg C. in air. The dried powder is then size-reduced and calcined at 750 deg C. for one hour in either argon or air atmosphere. It is then cold-pressed in a steel die at about 11,400 psi into cylindrical pellets, typically 1.27 cm in diameter, with length-to-diameter ratio less than one. Between pressings, the steel die is coated with a thin layer of about 10 wt % oleic acid in acetone as a die lubricant. No binders are used. The pellets are placed on platinum foil (recent practice) or on a thin layer of alumina or zirconia powder (earlier practice) and are then reaction-sintered in argon atmosphere (commercial purity) at 1350 deg C. for 4 hours. Some samples are fired in an air atmosphere or 5% CO in a balance of $CO_2$. The fired densities are routinely evaluated using weight and geometric size, and are typically 90% of the calculated theoretical maximum density or higher. Phase composition is routinely evaluated by X-ray diffraction analysis (XRD) and scanning electron microscopy (SEM)-energy dispersive spectrometry (EDS). Detailed analysis by electron microprobe is performed on select samples.

In large-scale, production form testing, the precursor powders are wet-mixed for a minimum of two hours using a ball mill with $ZrO_2$ grinding media and deionized water. They are then separated by sieving and flushing with water and are dried overnight at about 105 deg C. in air. The dried powder is then size-reduced and calcined at 750 deg C. for one hour in an air atmosphere. The calcined precursors are then blended with the actinide oxides using either wet ball milling for a minimum of two hours or dry attritor milling for a minimum of three minutes. When wet ball milling is used, the powder is dried again at 105° C. and size reduced. Granulation of the blended material is then performed with addition of binders. Lubricants may also be added during the granulation step. The granulated powder is then cold-pressed in a steel die at about 2,000 psi into pucks, typically 8.89 cm in diameter and 3.18 cm in thickness. When an internal lubricant is not used, the steel die is coated with a thin layer of about ten weight percent oleic acid in acetone between pressing. The pucks are placed on refractory with a thin layer of alumina or zirconia powder or on zirconia coated refractory. The pucks are then reaction-sintered in an air atmosphere at 1350 deg C. for 4 hours. The fired densities are routinely evaluated using weight, geometric size, and immersion volume, and are typically 90% of the calculated theoretical maximum density or higher. Phase composition is routinely evaluated by X-Ray Diffraction analysis (XRD). Detailed analysis by Scanning Electron Microscopy (SEM)-Energy Dispersive Spectrometry (EDS) and electron microprobe is performed on select samples.

Unsintered disc sizes range from 1.27 to 8.89 cm in diameter, and 0.25 to 3.18 cm in thickness. Sintered disc sizes range from 0.5 to 6.67 cm, and 0.12 to 2.39 cm in thickness.

Baseline Formulation Chemistry

The pyrochlore-based baseline product form is observed to be composed of about 80 vol % pyrochlore, about 12 vol % brannerite, and about 8 vol % rutile. Zirconolite can also be present, but it is not generally observed when the sample is well reacted and when there are no feed impurities present. Pyrochlore and zirconolite are very closely related minerals. The primary difference in the structures arises from the way the characteristic layers of $TiO_6$ octahedra are stacked. Zirconolite actually has several structural polytypes that also differ in the way the characteristic layers are stacked: zirconolite-2M, zirconolite-3T, and zirconolite-4M (polymygnite) to name those that have actually been observed in this ceramic form. The number corresponds to the number of layers before the stacking repeats itself and the letter stands for the crystal symmetry, M for monoclinic and T for trigonal. When the layers are aligned in a body-centered fashion, the pyrochlore phase is formed.

Figure 2:
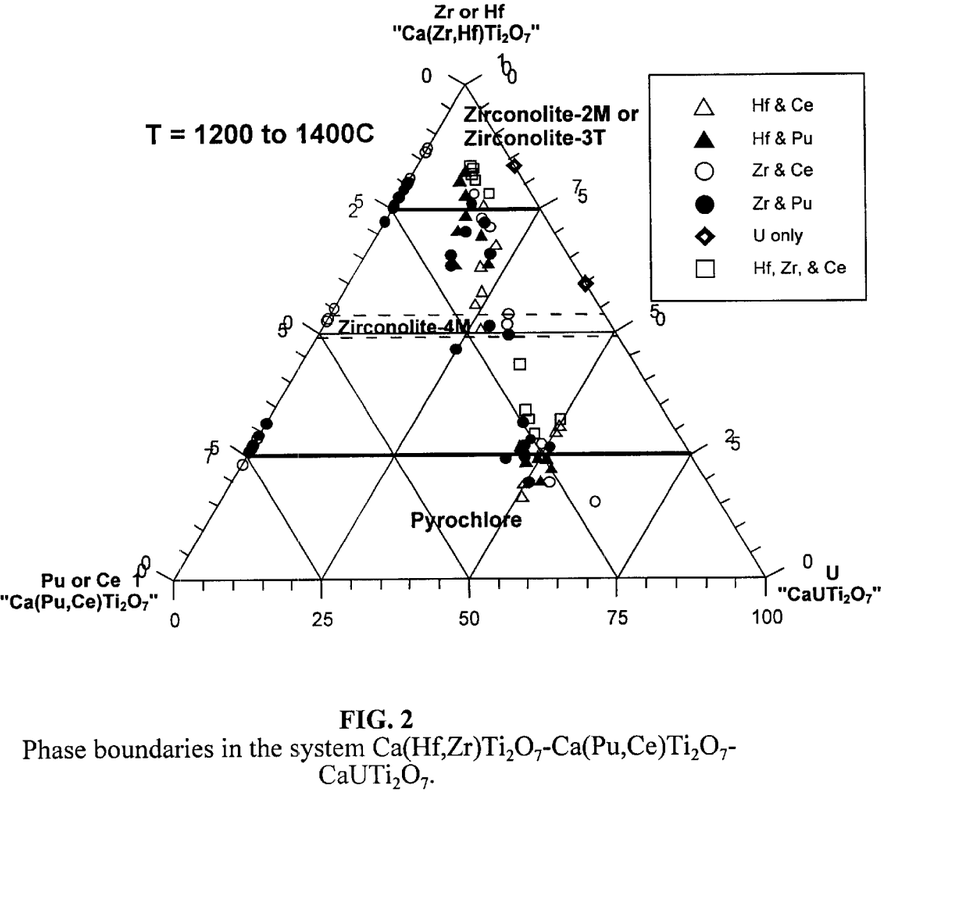
FIG. 2 illustrates the phase boundaries in the zirconolite, and plutonium, uranium pyrochlore system.

The phase relationship between pyrochlore and zirconolite and its polytypes is one important part of defining the baseline formulation. To depict the phase relationships, a pseudo-ternary diagram is given in FIG. 2. The end points are zirconolite ($CaZrTi_2O_7$ or $CaHfTi_2O_7$), Pu-pyrochlore ($CaPuTi_2O_7$ or its surrogate $CaCeTi_2O_7$), and U-pyrochlore ($CaUTi_2O_7$). The open points are data from Ce-loaded samples, and the solid points are data from the Pu-loaded samples. The squares contain Hf and Zr and the diamonds contain U only. The circles are data from the Zr-loaded samples, and the triangles are from the Hf-loaded samples. Many of the samples contain Gd, which had to be factored out in order to depict all the data on one ternary diagram. For simplicity the Gd was all assumed to be entirely on the Ca site, which is accurate in many cases. As a result of this assumption, FIG. 2 is more correctly described as a ternary plot consisting of the three components, (1) Pu or Ce, (2) Hf or Zr, and (3) U. The baseline composition in this diagram is at approximately 0.49 units of U, 0.25 units of Pu, and 0.26 units of Hf.

FIG. 2 clearly shows that the equilibrium phase behavior of Hf and Zr and of Ce and Pu are for all practical purposes indistinguishable. Closer inspection reveals that the equilibrium phase behavior of U is also identical to that of Ce and Pu, i.e. the pyrochlore phase boundary is independent of the total U, Pu, and Ce composition. Note that with a comparable offset adjustment in the U-loading, the Pu-loading in the form can be adjusted anywhere from 0 to about 32% without appreciably changing the mineralogy in the baseline form. The regime above 0.7 units of Ce, Pu, and U is the pyrochlore single-phase regime. The region above about 0.8 units of Hf and Zr is the single phase zirconolite regime (–2M). There is some scatter in the zirconolite boundary. This is due at least in part to a temperature effect. At around 1400 deg C., the boundary appears to be closer to about 0.75 formula units, and at around 1200 deg C., the boundary appears to be closer to about 0.85 formula units. An intermediate phase generally occurs at about 0.5 formula units of Hf or Zr. This is the zirconolite-4M phase. This phase is generally not observed in samples with impurities.

Microprobe analyses on a number of samples have been averaged to give the nominal atomic compositions of the primary phases in the ceramic form. The nominal atomic compositions are given in Table I. For zirconolite and pyrochlore, the total metal composition is normalized to 4. For brannerite, the total metal composition is normalized to 3, and for rutile and actinide oxide, it is normalized to unity. The corresponding amount of oxygen based on the assumed oxidation states shown is given in the O equivalent column.

In the ideal structures, the oxygen equivalents for pyrochlore, zirconolite, brannerite, rutile, and actinide oxide are 7, 7, 6, 2, and 2, respectively.

TABLE I

Elemental compositions in baseline form

| Phase | Ca | Gd | Hf | U | Pu | Ti | Al | Total Metal | O equiv. |
|---|---|---|---|---|---|---|---|---|---|
| Pyrochlore | 0.905 | 0.217 | 0.265 | 0.432 | 0.237 | 1.905 | 0.037 | 4.00 | 6.964 |
| Zirconolite | 0.741 | 0.147 | 0.839 | 0.133 | 0.116 | 1.842 | 0.181 | 4.00 | 7.093 |
| Brannerite | 0.071 | 0.110 | 0.135 | 0.534 | 0.212 | 1.888 | 0.050 | 3.00 | 5.849 |
| Rutile | 0.000 | 0.000 | 0.083 | 0.010 | 0.000 | 0.900 | 0.007 | 1.00 | 1.997 |
| Actinide oxide | 0.079 | 0.045 | 0.029 | 0.426 | 0.381 | 0.015 | 0.025 | 1.00 | 1.186 |
| Assumed oxidation state | 2+ | 3+ | 4+ | 4+ | 4+ | 4+ | 3+ | | |

One of the interesting features in the compositions shown in Table I is that although the phase boundaries appear to be the same for the use of either $UO_2$ or $PuO_2$ in the formulation, the elemental partitioning between the phases is different. Notice that U is enriched relative to Pu in the brannerite phase and depleted relative to Pu in the zirconolite phase. These enriched and depleted relationships are based on comparison to the approximate 2-to-1 ratio of U-to-Pu in the dominant pyrochlore phase, which corresponds to the U-to-Pu ratio in the ceramic composition as a whole.

Actinide Oxide Dissolution Kinetics

Dissolution of "high-fired" $PuO_2$ or $PuO_2/UO_2$ into the ceramic form seems to be affected significantly by temperature, process impurities, and thoroughness of mixing, and to a lesser extent by the relative abundance of the primary phases. Note that all "high-fired" $PuO_2$ used in these tests was heated to 1000 deg C. for 4 hours in an air atmosphere and all the "high-fired" $PuO_2/UO_2$ was heated to 950 deg C. for 2 hours in an argon atmosphere.

In earlier formulation work, a zirconolite-rich formulation was being developed, and data on actinide dissolution kinetics was obtained for this formulation. In addition to the matrix phase of zirconolite, the form contained Ba-hollandite, rutile, and pyrochlore. In this set of experiments performed at LLNL, the "high-fired" $PuO_2$ was sieved through a 600 mesh sieve (i.e., the particles were less than 20 microns diameter) and the precursors were then dry mixed by hand in a V-shaped mixer. A half dozen pellets were pressed at between 30 and 80 MPa and fired at 1300 deg C. for 4 hours. After the first firing, the product densities varied from about 89 to 96% of the theoretical maximum (4.9 g/cm³). The samples were then separated into 3 pairs and fired at 1300, 1350, or 1400 deg C. for 4 hours. One of each pair was then subjected to a simulated DWPF thermal cycle. Results of the thermal treatment tests are discussed later. All of the product pellets were analyzed using the SEM/microprobe. The pellets with the 1300 deg C. final firing temperature had large chunks of "unreacted" $PuO_2$ up to about 20 microns in diameter. The $PuO_2$ is termed "unreacted" in this case since it was found to be essentially pure $PuO_2$. The pellets fired at 1350 deg C. had a small amount of "reacted" $PuO_2$, typically 3 microns in diameter or less. The $PuO_2$ is termed "reacted" in this case because it was found to contain significant and consistent amounts of Gd and Zr. Only one "reacted" $PuO_2$ grain barely larger than 2 microns diameter was found in the sample with the final firing temperature of 1400 deg C. From these data it is clear that 1300 deg C. is an inadequate temperature to achieve $PuO_2$ dissolution into the zirconolite-rich ceramic form. However, 4 hours at 1350 deg C. appears to be adequate time and temperature to achieve dissolution of $PuO_2$ particles up to about 20 microns in diameter into the zirconolite-rich ceramic matrix. Apparently, the reaction kinetics increase significantly between 1300 and 1350 deg C. It is not known for certain, but the significant increase in reaction kinetics is believed to be the result of a minor liquid phase that forms at temperatures greater than about 1325 deg C.

The current baseline formulation is pyrochlore-rich not zirconolite-rich. In more recent work performed at ANSTO, a mixture of "high-fired" $PuO_2/UO_2$ (1 part Pu per 2 parts U) was dry-milled with ceramic precursors, pressed into pellets at about 90 MPa and fired at temperatures ranging from 1275 to 1400 deg C. for 4 hours. The $PuO_2/UO_2$ feed material was composed of a number of large agglomerates greater than 10 microns but less than about 20 microns in diameter. Most firings were performed in an argon atmosphere, but some were performed in air. The results suggest that the particle size requirements for the pyrochlore-based form are less stringent than for the previously mentioned zirconolite-rich form. Enhanced dissolution was generally observed as the temperature was increased, but even at 1300 deg C. the $PuO_2/UO_2$ dissolution was satisfactory, much better than in the previously mentioned work on the zirconolite-rich formulation. All residual $PuO_2/UO_2$ in the pyrochlore-rich ceramic form fell into the category of "reacted," i.e., it contained significant and relatively consistent amounts of Gd and Hf.

Two other important general observations have been made. First, the residual "reacted" $PuO_2/UO_2$ in the pyrochlore-rich formulation is essentially always observed to be encapsulated within the brannerite grains. This indicates that by decreasing the amount of the brannerite component in the formulation, enhanced $PuO_2$ and/or $UO_2$ dissolution can be obtained. Second, feed impurities such as silica enhance $PuO_2$ and/or $UO_2$ dissolution considerably. Since feed impurities can also aid densification, their presence in limited quantities can be advantageous to the ceramic form. Note that although a reactive "low-fired" $PuO_2$ was never tested, it has been found that a sufficiently small $PuO_2$ and/or $UO_2$ particle size and good mixing are more than sufficient to achieve dissolution of $PuO_2$ and/or $UO_2$ into the ceramic form. Therefore, any enhanced dissolution into the ceramic form that could be gained by using "low-fired" $PuO_2$ is not required.

Feed Impurity Tolerances

Tolerance of the ceramic form to the range of feed impurities expected is an important part of making the ceramic form a viable and attractive candidate for Pu disposition. A relatively large amount of work was conducted in this area at LLNL, SRS, and ANSTO. A set of 10 Pu-sample compositions and 10 Ce-sample compositions were prepared according to the general procedure described in the experimental section. Pu-sample compositions are given in Table II. Composition A-0 is the baseline ceramic form. Compositions A-1 to A-6 correspond to various general categories of feed material that are expected. A-1 corresponds to typical impure oxides. Nominally about 5 metric ton (MT) of currently declared U.S. excess Pu falls into this category. A-2 corresponds to the composition of Pu from the Zero Power Physics Reactor (ZPPR) plates. Nominally about 3 MT of current excess Pu falls into this category. A-3 corresponds to the composition of atypical impure metal. Nominally about 2 MT of current excess Pu falls into this category. A-4 corresponds to the composition of atypical clean metal. Nominally about 1 MT of current excess Pu falls into this category. A-5 corresponds to the composition of U/Pu oxides. Nominally about 1 MT of current excess Pu falls into this category. A-6 corresponds to the composition of Pu alloys. Nominally about 1 MT of current excess Pu falls into this category. A-7 is an overall estimated average composition for the 17 MT excess Pu case. A-8 is an estimated most extreme case. A-9 is an intermediate case between A-7 and A-8 that corresponds roughly to one of the extreme compositions tested in the competing glass formulation work.

dominant phase, even sample A-8 which had 13 wt % total impurities in the product. Several trends were observed. Si could not be incorporated significantly into any of the primary ceramic phases. $SiO_2$ forms a separate glassy phase that contains significant amounts of Ca, Al, Ti, and other impurities but little or no Pu or U. Excess amounts of Al in the feed also increase the likelihood of the glass phase formation. The same effect seems to be observed for P. $P_2O_5$ was not intentionally added to the form, but was found to be present at about 200 ppm in the $TiO_2$ starting material. $P_2O_5$ forms a separate phase (presumably whitlockite) that is rich in Ca and P. In general, all other impurities were either vaporized or accommodated into at least one of the primary ceramic phases. Compositions that were low in impurities produced ceramics that were for the most part rich in brannerite and lean in zirconolite, and compositions that were rich in impurities produced ceramics that were for the most part lean in brannerite and rich in zirconolite. As mentioned earlier, the impurities seem to enhance the reaction kinetics considerably. Compositions with the highest impurity levels had the least amount of actinide oxide in the product, as low as 0.04 vol %, and compositions with the lowest impurity levels had the greatest amount of actinide oxide in the product, as high as 0.6 vol %. Based on image analysis of the SEM images obtained, the compositional range observed in the suite of impurities tests was as

TABLE II

Compositions of samples fabricated in the feed impurity tests.
(Totals may not exactly equal 100% because of rounding)

| | A-0 wt % | A-1 wt % | A-2 wt % | A-3 wt % | A-4 wt % | A-5 wt % | A-6 wt % | A-7 wt % | A-8 wt % | A-9 wt % |
|---|---|---|---|---|---|---|---|---|---|---|
| Base Feed Materials | | | | | | | | | | |
| CaO | 9.95 | 9.67 | 9.89 | 9.73 | 9.92 | 9.85 | 9.83 | 9.80 | 8.65 | 9.44 |
| $TiO_2$ | 35.87 | 34.88 | 35.64 | 35.08 | 35.77 | 35.50 | 35.43 | 35.34 | 31.20 | 34.04 |
| $HfO_2$ | 10.65 | 10.35 | 10.58 | 10.41 | 10.62 | 10.54 | 10.52 | 10.49 | 9.26 | 10.11 |
| $Gd_2O_3$ | 7.95 | 7.73 | 7.90 | 7.77 | 7.93 | 7.87 | 7.85 | 7.83 | 6.91 | 7.54 |
| $UO_2$ | 23.69 | 23.03 | 23.54 | 23.17 | 23.63 | 23.45 | 23.40 | 23.34 | 20.60 | 22.48 |
| $PuO_2$ | 11.89 | 11.56 | 11.81 | 11.63 | 11.86 | 11.77 | 11.75 | 11.71 | 10.34 | 11.28 |
| Impurities | | | | | | | | | | |
| $Al_2O_3$ | | 0.63 | 0.20 | 0.22 | | 0.11 | 1.04 | 0.32 | 1.59 | 0.50 |
| MgO | | 0.19 | | 0.23 | 0.02 | 0.46 | 0.18 | 0.13 | 0.87 | 0.44 |
| $CaCl_2$ | | 0.37 | | | | | | 0.16 | 2.19 | 0.66 |
| $Ga_2O_3$ | | | | 1.27 | 0.14 | | | 0.14 | | 0.57 |
| $Fe_2O_3$ | | 0.17 | | 0.14 | | 0.16 | | 0.08 | 0.50 | 0.15 |
| $Cr_2O_3$ | | 0.04 | | 0.02 | | | | 0.02 | 0.13 | 0.08 |
| NiO | | 0.08 | | 0.09 | | | | 0.04 | 0.33 | 0.13 |
| $CaF_2$ | | 0.21 | | | | | | 0.12 | 1.30 | 0.44 |
| $K_2O$ | | 0.15 | | 0.04 | | | | 0.07 | 1.05 | 0.32 |
| $Na_2O$ | | 0.16 | | | | | | 0.06 | 0.47 | 0.14 |
| $MoO_2$ | | 0.05 | 0.44 | | | 0.30 | | 0.11 | 0.47 | 0.28 |
| $SiO_2$ | | 0.51 | | | | | | 0.19 | 1.50 | 0.46 |
| $Ta_2O_5$ | | 0.05 | | 0.15 | | | | 0.06 | 0.64 | 0.19 |
| $B_2O_3$ | | 0.04 | | | | | | | 0.34 | 0.17 |
| $WO_2$ | | 0.14 | | 0.06 | | | | | 1.64 | 0.49 |
| ZnO | | | | | 0.11 | | | 0.01 | | 0.07 |

Sample preparation and characterization work was shared among the various participating sites. Samples A-1 to A-6 were generally prepared only at one site, whereas samples A-0, A-7, A-8, and A-9 were prepared at two or three different sites. At least one Ce-sample and one Pu-sample of each composition were successfully prepared. All of the Ce-samples and most of the Pu-samples have since been characterized to determine the product phase assemblages. All of the samples reacted well and formed pyrochlore as the follows: pyrochlore-62 to 90 vol %, brannerite-0 to 22 vol %, zirconolite-0 to 25 vol %, rutile-0 to 16 vol %, actinide oxide-0.004 to 0.6 vol %, and silicate glass-0 to 6 vol % as shown in Table III.

Note that these samples were fired at 1350 deg C. for 4 hours in an argon atmosphere. Sample compositions with $CeO_2$ used 0.634 times the $PuO_2$ mass listed in order to keep the molar compositions the same.

TABLE III

Product Mineralogy

| Mineralogy | Baseline (vol %) | Observed Range (vol %) | Acceptable Range (vol %) |
|---|---|---|---|
| Pyrochlore | 80 | 62–90 | >50 |
| Brannerite | 12 | 0–22 | 0–50 |
| Zirconolite | 0 | 0–25 | 0–50 |
| Rutile | 8 | 0–16 | 0–20 |
| Actinide Oxide | 0.5 | 0.04–0.6 | 0–1 |
| Silicate and other phases | 0 | 0–6 | 0–10 |

Many of the samples were analyzed by electron microprobe analysis. These data were used to generate the preliminary partitioning coefficients given in Table IV. As is readily seen, the more common impurities, namely Al, Cr, Fe, Ni, Ga, and Mg, partition preferentially into zirconolite. A few impurities partition preferentially into the pyrochlore phase, namely Mo, Ta, and W. Na, K, and Zn tend to vaporize and/or to partition into the silica-rich glassy phase, but the little that remains in the primary phases does seem to partition selectively. Some data are also given for the relative partitioning of impurities into brannerite compared to pyrochlore. With the possible exception of Ni and Zn, the impurities do not seem to partition significantly into the brannerite phase.

TABLE IV

Approximate partitioning coefficients for various impurities.

| Element | $X_{zirconolite}/X_{pyrochlore}$ | $X_{brannerite}/X_{pyrochlore}$ |
|---|---|---|
| Al | 16 | 2.3 |
| Cr | 15 | — |
| Fe | 3 | 1 |
| Ga | >30 | — |
| K | <0.05 | — |
| Mg | 3.0 | <0.1 |
| Mo | 0.10 | 0.20 |
| Na | <0.1 | 0.2 |
| Ni | 1.5 | 2 |
| Ta | <0.1 | <0.1 |
| W | 0.020 | — |
| Zn | 4 | 5 |

The partitioning coefficient is given as the mole fraction of the element in the phase of interest divided by the mole fraction of the element in the pyrochlore phase The maximum impurity levels demonstrated are as shown in Table V.

TABLE V

Maximum Impurity Levels Demonstrated

| Impurity | Product Concentration (wt %) | Equivalent Feed Concentration (wt %) |
|---|---|---|
| $Al_2O_3$ | 10.0 | 48.3 |
| $B_2O_3$ | 1.0 | 7.8 |
| BaO | 2.3 | 16.3 |
| $CaCl_2$ | 2.19 | 15.8 |
| $CaF_2$ | 10.0 | 48.3 |
| CaO | 10.0 | 48.3 |
| $Cr_2O_3$ | 10.0 | 48.3 |
| $Cu_2O$ | 10.0 | 48.3 |
| $Fe_2O_3$ | 10.0 | 48.3 |
| $Ga_2O_3$ | 15.3 | 60.2 |
| $K_2O$ | 1.05 | 8.9 |
| MgO | 10.0 | 48.3 |
| $MnO_2$ | 10.0 | 48.3 |
| $MoO_3$ | 10.9 | 50.7 |
| $Na_2O$ | 0.47 | 4.3 |
| $Nb_2O_5$ | 10.7 | 50.2 |
| NiO | 10.0 | 48.3 |
| $P_2O_5$ | 5.1 | 31.0 |
| PbO | 0.5 | 4.2 |
| $SiO_2$ | 1.50 | 12.7 |
| $SnO_2$ | 4.1 | 26.6 |
| $Ta_2O_5$ | 13.0 | 55.8 |
| $WO_3$ | 16.4 | 62.3 |
| ZnO | 10.0 | 48.3 |
| Max. Tot. | 13.0 | 55.7 |

Max. Tot. is the maximum combined total of impurities that was tested. Product concentration is the concentration of the impurity in the immobilized product. Equivalent feed concentration is the equivalent feed concentration of the impurity in the $PuO_2$ feed.

Stability with Respect to the DWPF Pour

Since it is planned that cans containing the ceramic will be enveloped in molten glass during the glass pouring operation at the DWPF, it is important to know that the ceramic will remain stable during this process. Tests in this area fell into two basic areas, evaluation of potential mineralogical and compositional changes during the heating and the slow cool-down, and evaluation of potential cracking during the rapid heat-up.

The heating and slow cool-down process was simulated by heating the product forms to between 1000 and 1200 deg C. and cooling at between 1 and 2 deg C. per minute. In every case, no mineralogical change was observed. Phase compositions before and after thermal treatment were analyzed by electron microprobe or quantitative EDS analysis. In every case, there was little or no compositional change. Any small compositional differences observed were well within the statistical variations expected. Compositions before and after one of the thermal treatment tests are given in Table VI. In this particular test, the previously mentioned zirconolite-rich samples were used. These were the samples with the final firing temperature of 1350 deg C. One of the two samples was then subjected to a simulated DWPF thermal heating and cooling cycle: heat to 1000 deg C., hold for 15 minutes, cool to 500 deg C. at 2 deg C. per minute, then cool to ambient at 1 deg C. per minute or slower. There were five phases in the sample: zirconolite, pyrochlore, rutile, hollandite, and "reacted" $PuO_2$. Only the compositions for the Pu-bearing phases are given in Table IV. Under the column of DWPF, a "no" means that the data are from the sample that was not subjected to the simulated DWPF thermal cycle and a "yes" means that the data are from the sample that was subjected to the simulated DWPF thermal cycle. Note that the compositional analyses are surprisingly close, even for the "reacted" $PuO_2$.

A test was also performed in which molten DWPF-type glass was heated to about 1100 deg C. and was then poured directly onto bare non-radioactive ceramic pellets to determine qualitatively how badly the ceramic would crack because of the thermal shock. In short, the cracking was minimal. Out of 7 pellets, ranging from 2.5 to 4 cm in diameter, only one pellet cracked into two separate pieces. All the other pellets remained intact, with little or no observed cracking.

TABLE VI

Effect of DWPF heating and cooling cycle on mineralogical composition.
(Compositions determined by electron microprobe analysis. Totals may not exactly match final column because of rounding))

| Phase | DWPF | CaO | BaO | $GdO_{1.5}$ | $ZrO_2$ | $PuO_2$ | $TiO_2$ | $AlO_{1.5}$ | Total |
|---|---|---|---|---|---|---|---|---|---|
| Zirconolite | No | 0.612 | 0.000 | 0.238 | 0.799 | 0.194 | 1.757 | 0.399 | 4.000 |
| Zirconolite | Yes | 0.633 | 0.000 | 0.234 | 0.805 | 0.201 | 1.732 | 0.394 | 4.000 |
| Pyrochlore | No | 0.713 | 0.022 | 0.255 | 0.225 | 0.617 | 2.131 | 0.037 | 4.000 |
| Pyrochlore | Yes | 0.739 | 0.037 | 0.238 | 0.230 | 0.622 | 2.089 | 0.045 | 4.000 |
| $PuO_2$ | No | 0.000 | 0.007 | 0.044 | 0.188 | 0.717 | 0.044 | 0.000 | 1.000 |
| $PuO_2$ | Yes | 0.000 | 0.008 | 0.044 | 0.186 | 0.724 | 0.040 | 0.000 | 1.000 |

From the data on impurity effects it is possible to generate a preliminary set of feed impurity specifications. It was learned that most impurities fell into one of four categories: (1) volatiles, (2) zirconolite stabilizers, (3) pyrochlore stabilizers, and (4) glass formers. The preliminary specification limits are given in Table VII. The limits given are all based on impurity sample A-9 (5.1 wt % impurities in the product) except for the limit on pyrochlore stabilizers, which is based on sample A-8 (13 wt % impurities in the product). The limits are reported in total moles per mole of $PuO_2$. Molar ratio is used rather than weight ratio since the impurities substitute into the ceramic form on an atomic basis and not on a weight basis. It is expected with further testing that the draft limits given in Table VII can be relaxed considerably.

TABLE VII

Preliminary specification limits on feed impurities.

| Category | Moles per mole $PuO_2$ | Impurities |
|---|---|---|
| Volatiles | 0.60 | NaCl, KCl, $CaCl_2$, $CaF_2$, $MgF_2$, etc. |
| Zirconolite stabilizers | 0.75 | $AlO_{1.5}$, $FeO_{1.5}$, $GaO_{1.5}$, $CrO_{1.5}$, MgO, $ZrO_2$, $HfO_2$, etc. |
| Pyrochlore stabilizers | 0.40 | $WO_2$, $MoO_2$, $TaO_{2.5}$, $NbO_{2.5}$ |
| Glass formers | 0.30 | $SiO_2$, $BO_{1.5}$ |

Obviously numerous modifications and variations of the present invention are possible in the light of the above teachings. It is therefore to be understood that within the scope of the appended claims the invention may be practiced otherwise than as specifically described therein.

What is claimed is:

1. A process for immobilizing actinide oxides in a ceramic form comprising pyrochlore, brannerite and rutile, which comprises the steps of:
   milling said actinide oxides into powder form to achieve powder particle size less than 50 microns;
   blending ceramic precursors with said powder, said ceramic precursors comprising neutron absorbers, oxides of titanium and hydroxides of calcium, wherein said blending is accomplished via wet ball milling or an attritor mill;
   pouring said blend into a die;
   cold pressing said blend at a pressure in the range of 1,000–20,000 psi;
   and sintering said pressed blend at a temperature range of 1200–1500 deg C. for 1–8 hours in an atmosphere selected from the group consisting of air, reducing atmosphere and inert atmosphere to form a ceramic material.

2. The process according to claim 1 wherein said actinide oxides are selected from the group consisting of uranium, plutonium, thorium, americium and neptunium.

3. The process according to claim 2 wherein the quantity of actinide oxide is no greater than 36 wt %.

4. The process according to claim 2 wherein said actinide oxides are uranium oxide and plutonium oxide.

5. The process according to claim 4 wherein the ratio of uranium oxide to plutonium oxide is 2:1.

6. The process according to claim 5 wherein the quantities of plutonium oxide and uranium oxide are 12 wt % and 24 wt % respectively.

7. The process according to claim 4 wherein said plutonium oxide has a nominal particle size less than 2 millimeters.

8. The process according to claim 1 wherein said actinide oxide is milled to a powder particle size of nominally 20 microns.

9. The process according to claim 1 wherein said neutron absorber material is at least one material selected from the group consisting of hafnium, gadolinium and samarium.

10. The process according to claim 9 wherein said neutron absorber materials are $HfO_2$ and $Gd_2O_3$, in the amounts of 10.6 wt % $HfO_2$ and 8 wt % $Gd_2O_3$, and the ratios of $Gd_2O_3$ to $PuO_2$ and $HfO_2$ to $PuO_2$ are each equal or greater than unity.

11. The process according to claim 1 wherein said oxide of titanium is $TiO_2$ (anatase) and said hydroxide of calcium is $Ca(OH)_2$.

12. The process according to claim 1 wherein said cold pressing step occurs at about 2000 psi.

13. The process according to claim 1 wherein said sintering step occurs at about 1350 deg C. with temperature held for four hours.

14. The process according to claim 1 wherein;
   said milling and blending steps are accomplished using a high-speed attritor mill.

15. The process according to claim 14 wherein said attritor mill is operated at approximately 950 rpm for a 1-gallon attritor mill and wherein the equivalent rpm is used for larger attritor mills by having tip speeds matched.

16. The process according to claim 14 wherein said attritor mill is operated for five minutes.

17. The process according to claim 14 further comprising adding a sufficient amount of dispersant to said attritor mill to maintain powder flowability and reduce holdup of the mill, said amount being in the range of a half of a percent to three weight percent.

18. The process according to claim 17 wherein said dispersant is selected from the group consisting of ethylene bis-stearamide, polyolefin, stearic acid, citric acid and monoisopropanol-amine.

19. The process according to claim 18 wherein said dispersant is a half a percent of ethylene bis-stearamide or three weight percent polyolefin.

20. The process according to claim 14 wherein said attritor mill utilizes a milling media with size ranging from two to five millimeters, and said media is selected from the group consisting of zirconia, aluminum oxide, depleted uranium, stainless steel, and ceramic.

21. The process according to claim 20 wherein said media is 5 mm spherical yttria stabilized zirconia.

22. The process according to claim 1 further comprising: granulating said blend prior to said pouring step to facilitate transfer of the blend into said die.

23. The process according to claim 22 further comprising: adding binder and lubricant materials to said blend during said granulating step.

24. The process according to claim 23 wherein said binder material is a mixture of hydroxy-propyl methylcellulose, polyethylene glycol and water.

25. The process according to claim 24 wherein the proportions of said mixture are 0.5 to 2 wt % hydroxy-propyl methylcellulose, 0.5 to 5 wt % polyethylene glycol, and 0.5 to 10 wt % water.

26. The process according to claim 23 wherein said lubricant material is polyolefin or ethylene bis-stearamide.

27. The process according to claim 22 further comprising: adding a binder material to said blend and applying a lubricant material to said die during said granulating step.

28. The process according to claim 27 wherein: said lubricant material is ten wt % oleic acid added to acetone.

29. The process according to claim 23 further comprising: heating said cold pressed material to a temperature between 100 and 300 deg C. and holding at said temperature for one-half to three hours to thoroughly dry said ceramic and decompose said binder and lubricant materials, prior to said sintering step.

30. The process according to claim 27 further comprising: heating said cold pressed material to a temperature between 100 and 300 deg C. and holding at said temperature for one-half to three hours to thoroughly dry said ceramic and decompose said binder and lubricant materials, prior to said sintering step.

31. The process according to claim 1 further comprising addition of sintering aids materials during said blending step to facilitate the sintering process.

32. The process according to claim 31 wherein said sintering aids materials are selected from the group consisting of $B_2O_3$, $Al_2O_3$, $SiO_2$, and alkalis and alkaline earth oxides, halides, sulfates, and hydroxides;
said halides are selected from the group consisting of fluorides, chlorides, bromides and iodides;
said alkalis are selected from the group consisting of lithium, sodium, potassium, rubidium and cesium; and
said alkaline earths are selected from the group consisting of magnesium, calcium, strontium and barium.

33. The process according to claim 32 wherein said sintering aids are in quantities ranging from 0.1 to 5 wt %.

34. The process according to claim 1 wherein said atmosphere is air.

35. The process according to claim 1 wherein said reducing atmosphere is a mixture of 5% CO and 95% $CO_2$.

36. The process according to claim 1 wherein said inert atmosphere comprises at least one gas selected from the group consisting of helium, neon, argon, krypton and xenon.

37. The process according to claim 36 wherein said gas is argon.

38. The process according to claim 1 further comprising: calcining said actinide oxides, prior to said blending step, at a temperature greater than 750 deg C., in an air or inert atmosphere.

39. The process according to claim 38 wherein said calcination occurs for about one hour at a temperature of 950 deg C.

40. The process according to claim 1 further comprising: calcining said ceramic precursors, prior to blending with said actinide oxides, in an air atmosphere at a temperature ranging from 700 to 800° C. for about one hour.

41. The process according to claim 40 wherein said calcination occurs for about one hour at a temperature of 750 deg C.

42. The process according to claim 1 further comprising:
placing said ceramic in a can;
placing said can in a canister;
pouring high level waste glass into said canister around said can.

43. The process according to claim 1 wherein said ceramic precursors are formed by the process comprising:
wet mixing said neutron absorbers, titanium oxides and calcium hydroxides;
drying said wet mixture;
size reducing said dried mixture; and
calcining said size reduced mixture.

44. A process for immobilizing plutonium and uranium oxides in a ceramic form comprising pyrochlore, brannerite and rutile, which comprises the steps of:
milling said oxides using a high-speed attritor mill into powder form to achieve nominal powder particle size of than 20 microns;
calcining ceramic precursors at a temperature of about 750 deg C., in an air atmosphere for about one hour, said ceramic precursors comprising $TiO_2$ (anatase), $Ca(OH)_2$ and neutron absorber materials $HfO_2$ and $Gd_2O_3$; blending said calcined ceramic precursors with said milled oxides powder using a high-speed attritor mill to a degree such that uniform blending on a scale of less than 20 microns is achieved;
granulating said blend with addition of binder and lubricant materials,
pouring said blend into a die and cold pressing said blend at 2000 psi,
heating said cold pressed blend to binder burnout temperature of 100 to 300 deg C. and holding at said temperature for one-half to two hours in an air atmosphere;
sintering said heated blend to 1350 deg C. and holding at said temperature for 4 hours in an air atmosphere;
and cooling said ceramic to room temperature.

45. A process for immobilizing actinides in a ceramic form comprising pyroclore, brannerite and rutile, which comprises the steps of:
oxidizing said actinides;
milling said actinide oxides into powder form to achieve nominal powder particle size less than 20 microns;
blending ceramic precursors with said powder, said ceramic precursors comprising neutron absorbers and oxides or hydroxides of titanium and calcium, wherein said blending is accomplished via wet ball milling or an attritor mill;

pouring said blend into a die;

cold pressing said blend at a pressure in the range of 1,000–20,000 psi;

and sintering said pressed blend at a temperature range of 1200–1500 deg C. for 1–8 hours in an atmosphere selected from the group consisting of air, reducing atmosphere and inert atmosphere to form a ceramic material.

46. The process according to claim 45 wherein said oxidizing step comprises:

hydriding said actinides to a fine powder;

nitriding said hydride powder;

oxidizing said nitride powder;

calcining said oxides; and removing any halide impurities present after said calcining step.

\* \* \* \* \*